April 29, 1941.   C. O. BALL   2,239,690
APPARATUS FOR CANNING
Filed Dec. 27, 1937   9 Sheets-Sheet 5
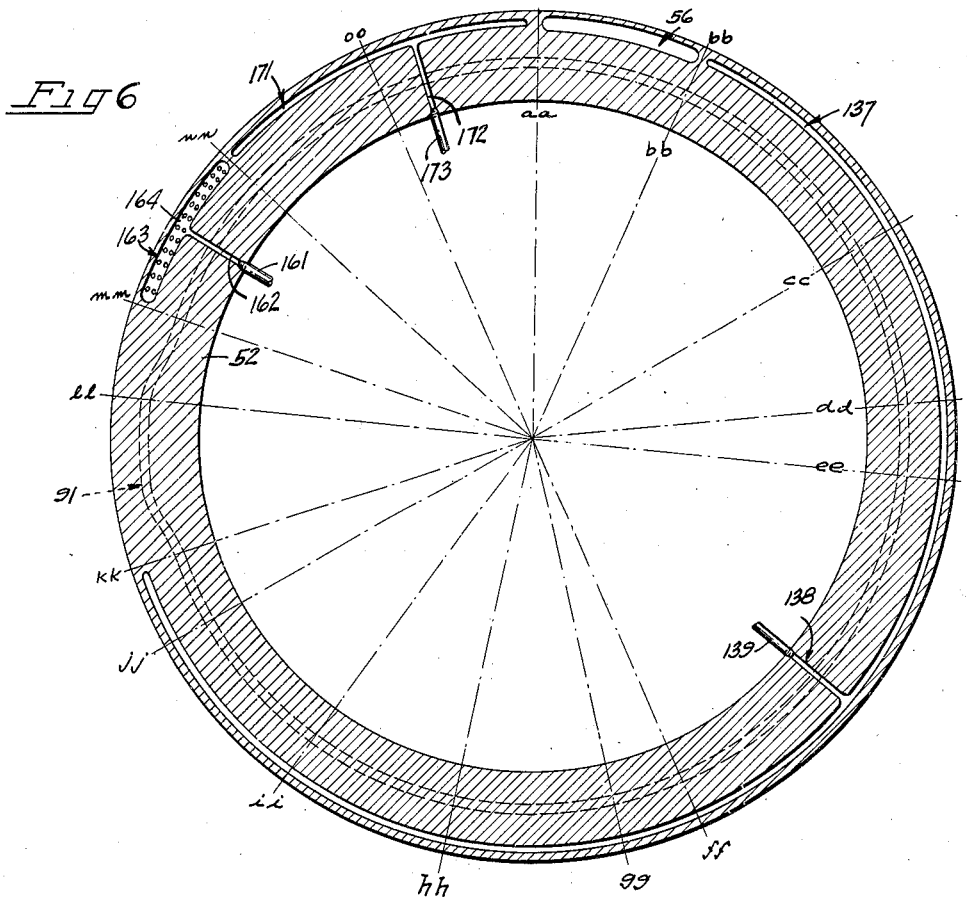
INVENTOR.
Charles O. Ball
BY
ATTORNEYS

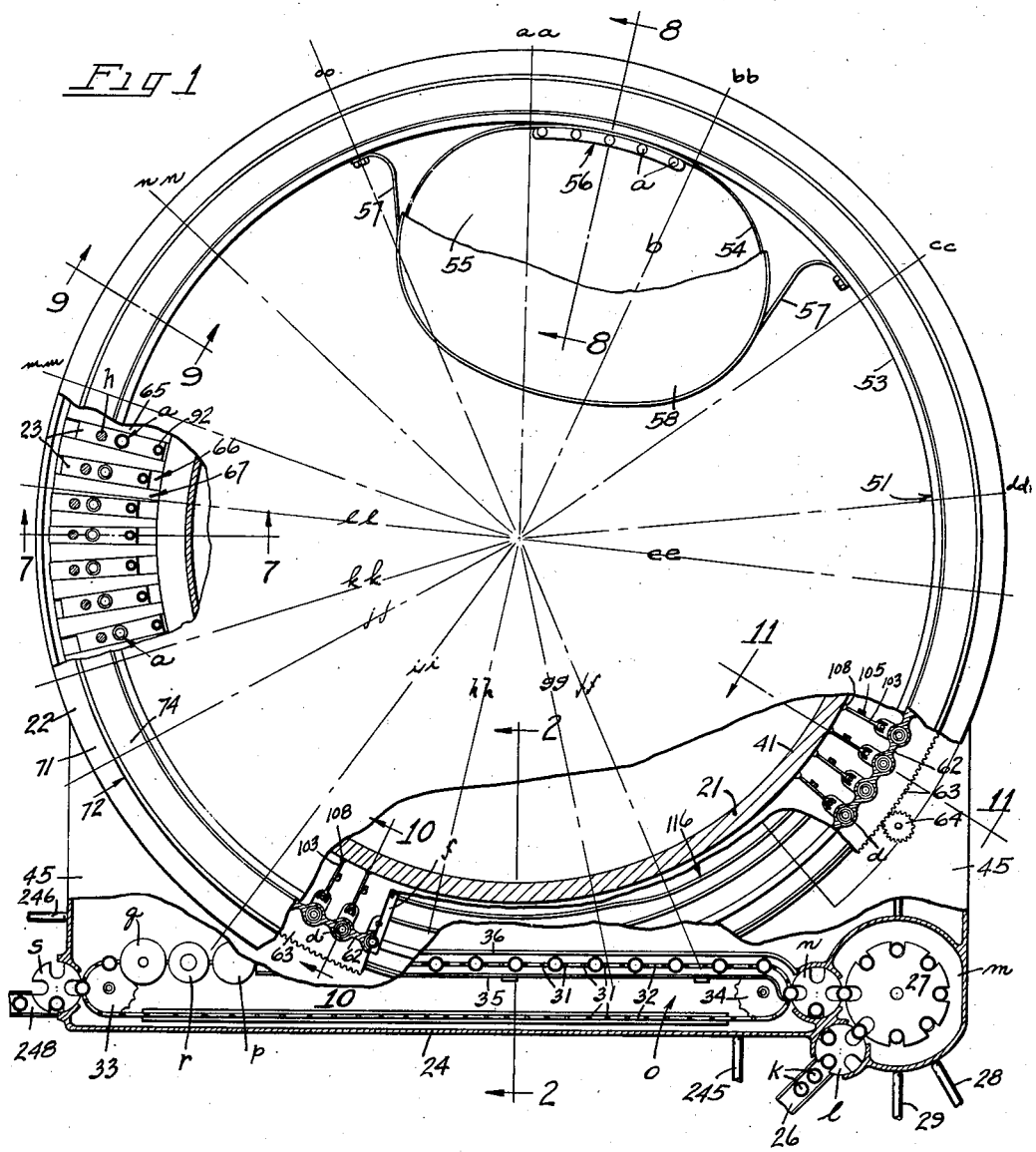

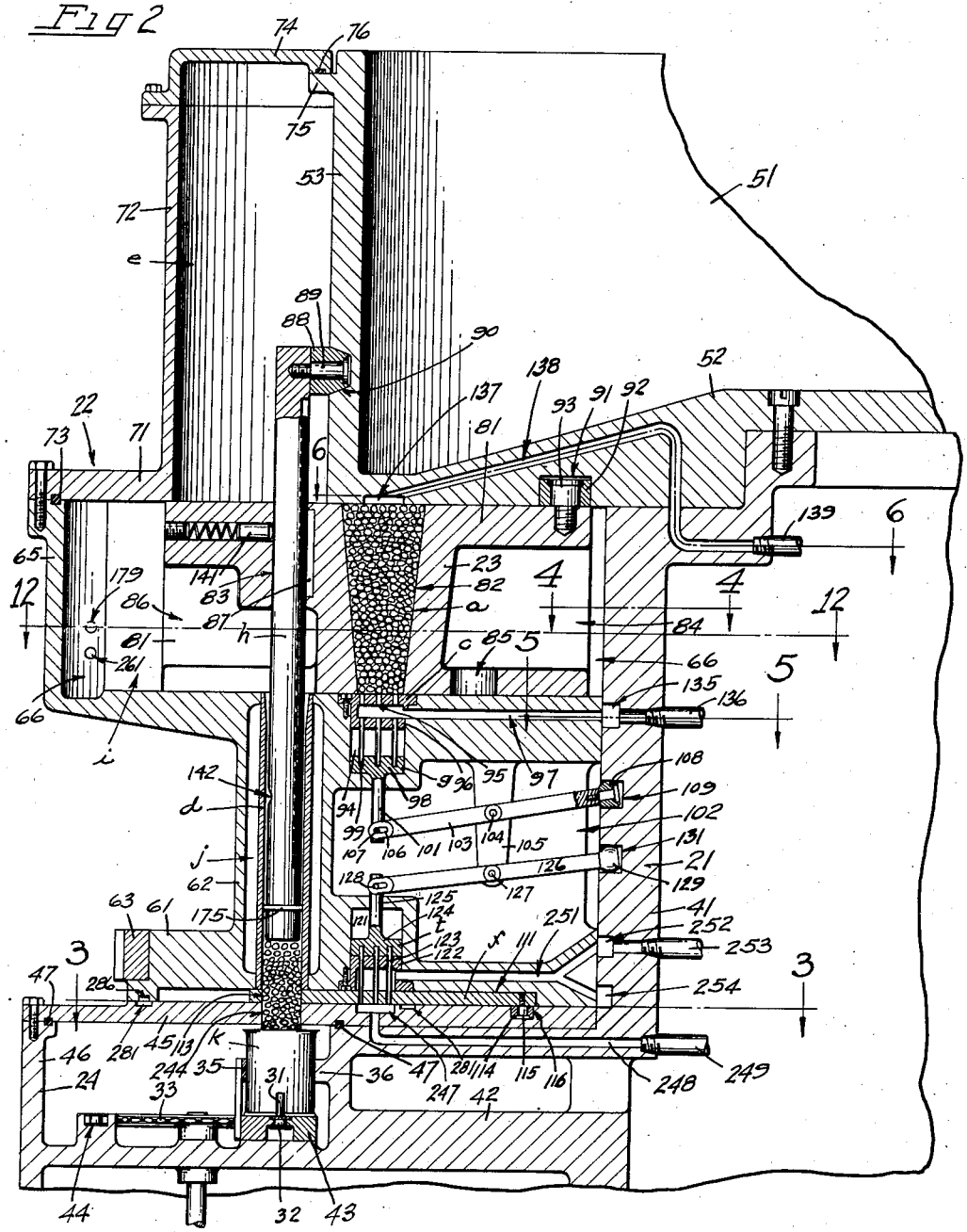

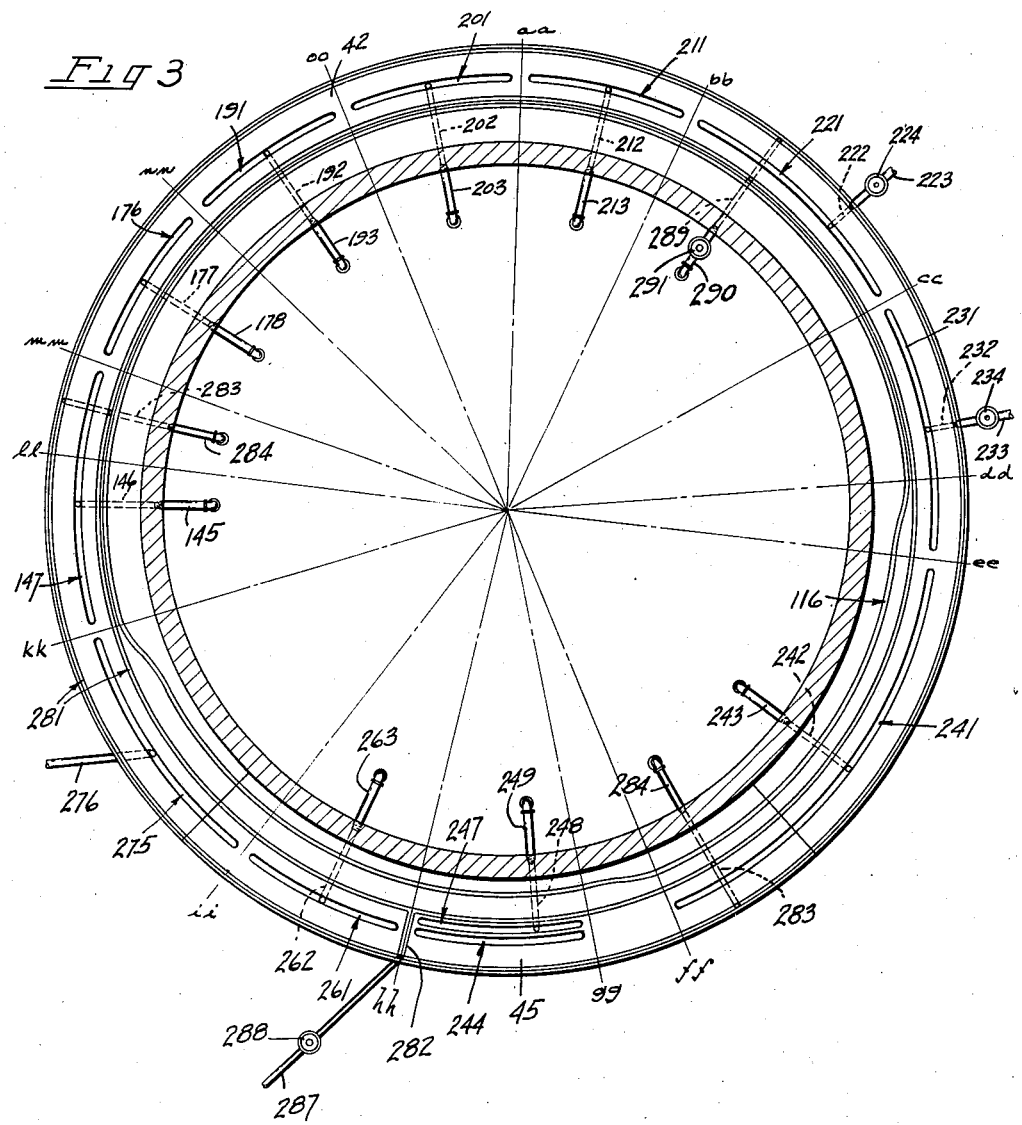

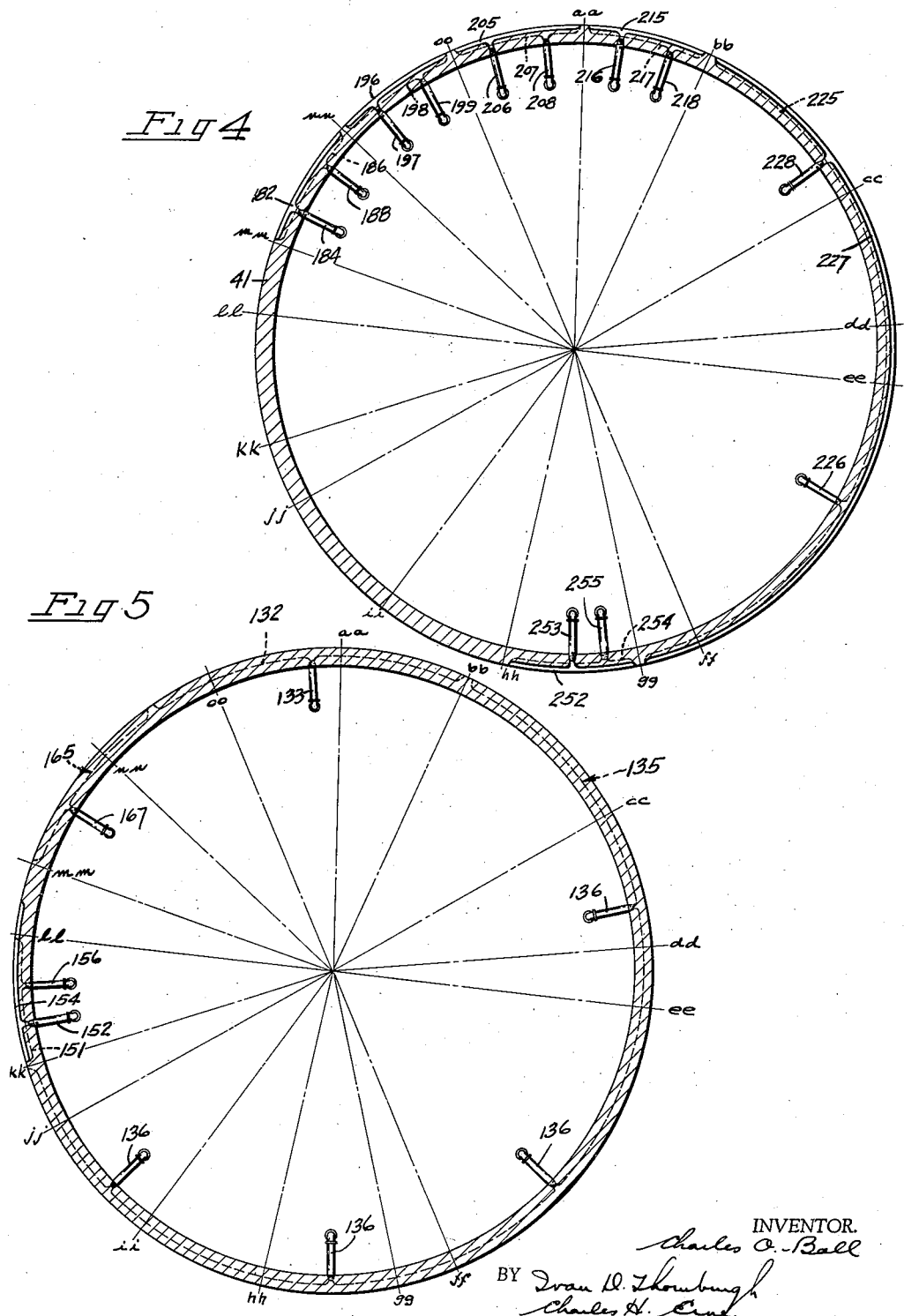

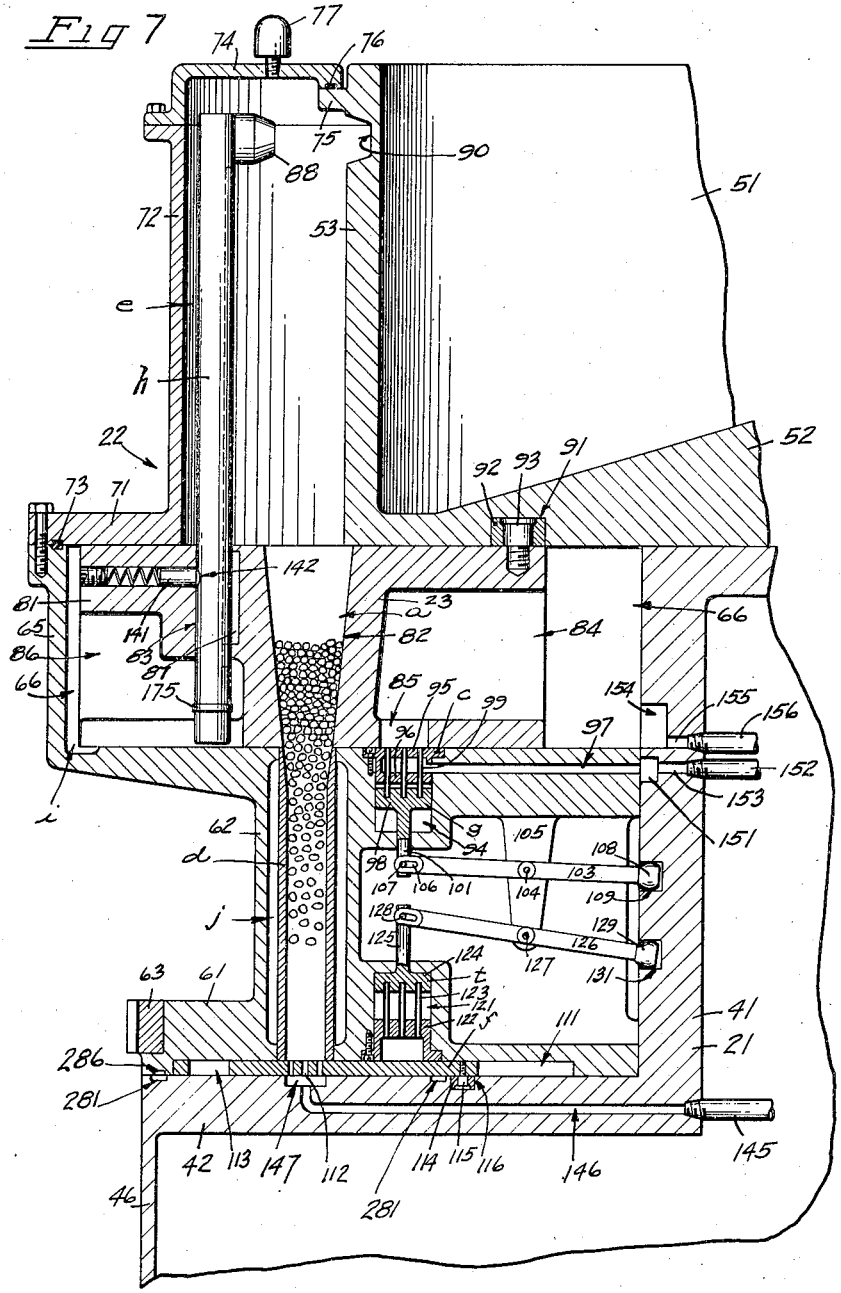

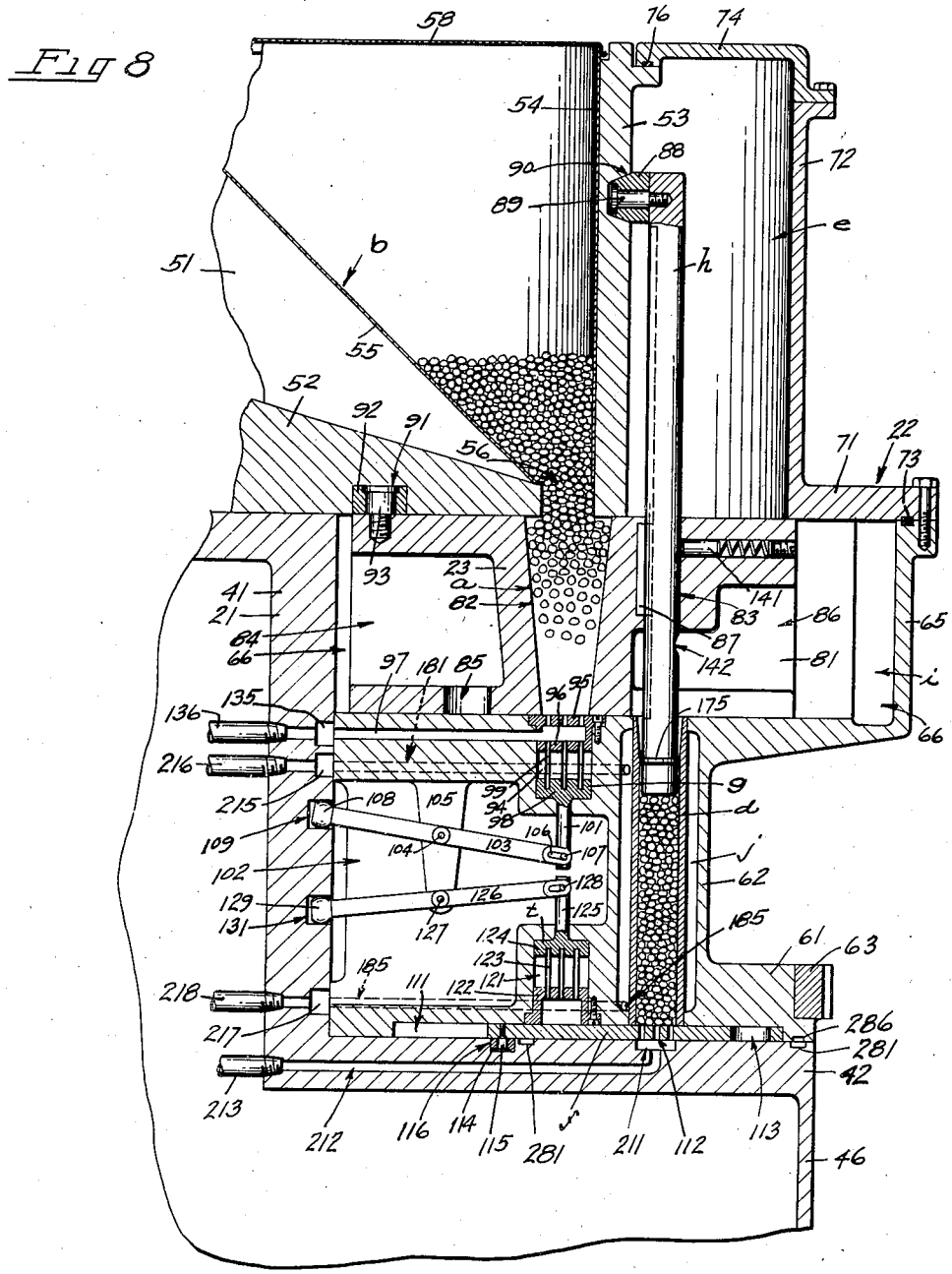

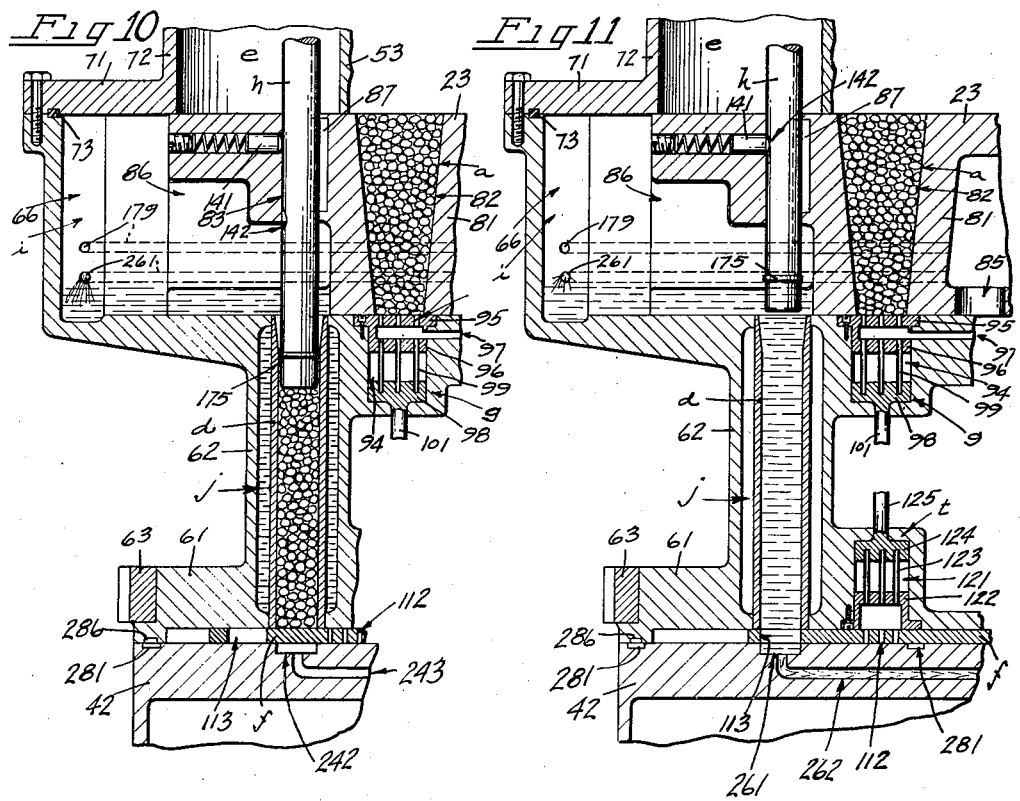
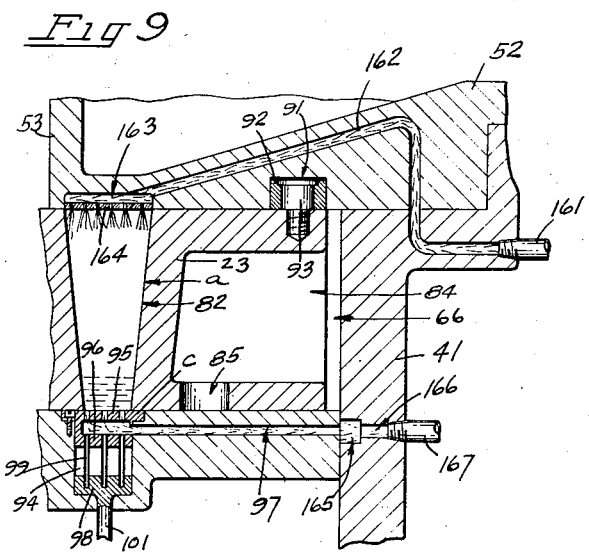

April 29, 1941.                    C. O. BALL                         2,239,690
                              APPARATUS FOR CANNING
                         Filed Dec. 27, 1937         9 Sheets-Sheet 9
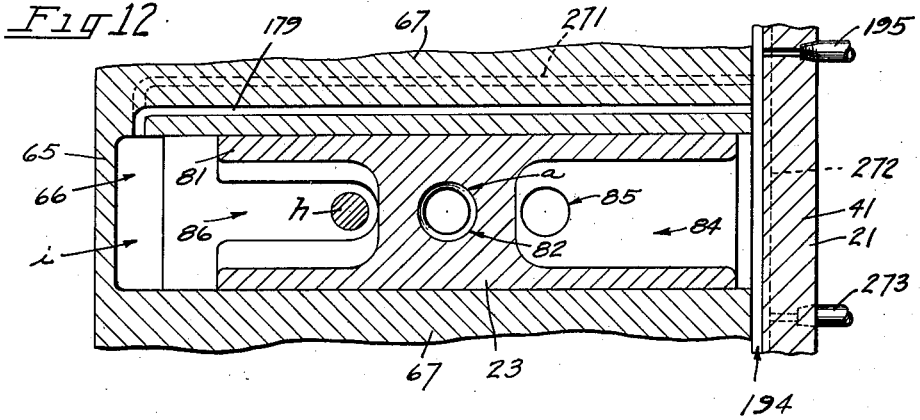
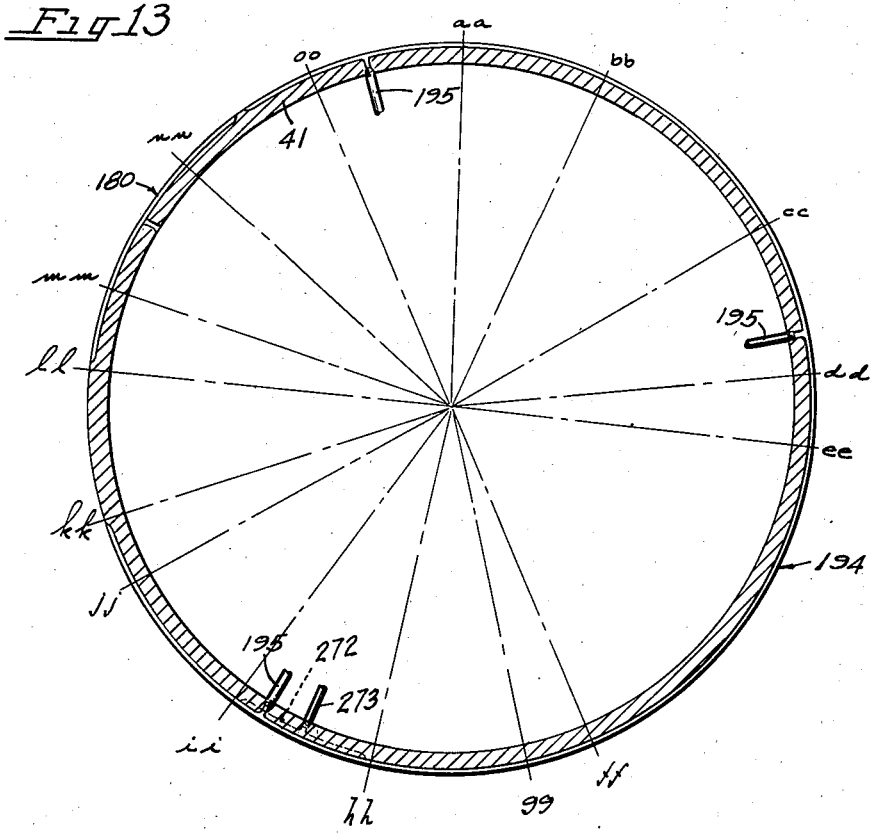
INVENTOR.
Charles O. Ball
BY Ivan D. Thornburgh
Charles H. Orde
ATTORNEYS Patented Apr. 29, 1941

2,239,690

UNITED STATES PATENT OFFICE 2,239,690

APPARATUS FOR CANNING

Charles O. Ball, Oak Park, Ill., assignor to American Can Company, New York, N. Y., a corporation of New Jersey Application December 27, 1937, Serial No. 181,944

14 Claims. (Cl. 99—251)

The present invention relates to a method of canning food products and to an apparatus for carrying out the method steps, and has particular reference to a continuous sequence of operations in a food canning method by means of which the food product is completely and quickly sterilized, cooled, filled into sterilized cans and heremetically sealed under sterile and sterilizing conditions.

An object of the invention is the provision of an improved sterilizing method of canning food products and of an apparatus for canning the same in a short period of time and under conditions that insure full and complete sterilization without change of taste or other characteristics of the food and which prevent contamination or recontamination throughout the various stages of the process.

A further object is the provision of such a canning method and apparatus by means of which the food product is first sterilized, the sterilized product is then cooled and following this it is filled into cans which have been sterilized, the filled cans then being hermetically sealed with can covers which have been sterilized, all of the steps being coordinated to insure a rapid and uninterrupted procedure.

Another object is the provision of a canning method in which a quantity of the product just sufficient to fill a single can is segregated from a mass of the product and the segregated charge is then subjected to sterilizing heats under progressively increased pressures accompanied by progressively increased temperatures.

Yet another object of the invention is the provision of a method of sterilization of a food product in batches by subjecting the same to high temperatures of steam under pressure while confining the product within a sealed enclosure.

A further object is the provision of a method of canning a food product in a cycle or series of connected steps which include sterilizing an empty can and sterilizing a predetermined quantity of the product with or without a liquid and then filling the sterilized product into the sterilized can and further adding a sterilized brine or other additional flavoring liquid or other substance if desired and hermetically sealing the filled can by utilizing a sterilized can cover, all of the operations being performed without subjecting cans, covers, or can contents to recontamination at any stage.

Yet another object in such a sterilization method has to do with prevention of contamination of any apparatus parts coming in contact with the food being handled, such parts being cleaned and sterilized with each use.

Another object of the invention is the provision of an improved sterilizing method of the character described in which the sterilized product prior to filling into the can is held under a vacuum and during that time is protected from bacterial contamination.

An additional object is the provision of an apparatus for canning a food product which is capable of sterilizing an empty can, sterilizing a predetermined quantity of the product in different stages, and then filling the sterilized product into the sterilized can.

Numerous other objects and advantages of the invention will be apparent as it is better understood from the following description, which, taken in connection with the accompanying drawings, discloses a preferred embodiment thereof.

Referring to the drawings:

Figure 1 is a plan view of an apparatus embodying the invention and one for carrying out the steps of the method, parts being broken back in different places and at different levels to more clearly illustrate certain of the operations;

Fig. 2 is an enlarged sectional view taken substantially along the line 2—2 in Fig. 1 showing one unit on one side of the machine;

Fig. 3 is a schematic plan of the lower part of the machine as it would appear if viewed along the broken line designated as 3—3 in Fig. 2, showing by means of cam tracks, grooves, ports, etc., the sequence of certain of the operations of the machine throughout one cycle;

Figs. 4 and 5 are similar plan views of the center part of the machine showing certain pipe connections and associated grooves, being taken at different levels indicated respectively by the lines 4—4 and 5—5 in Fig. 2;

Fig. 6 is a schematic plan of the upper part of the machine as taken along an imaginary course indicated by the broken line 6—6 in Fig. 2 showing only the central portion of the machine and suggesting the order of operation of some of the steps of the method;

Figs. 7, 8, 9, 10 and 11 are sectional views similar to Fig. 2 showing one unit as it would appear in its different positions throughout the operation cycle, the sections being taken substantially along the respective section lines 7—7, 8—8, 9—9, 10—10 and 11—11 in Fig. 1;

Fig. 12 is a plan sectional view taken substantially along the section line 12—12 in Fig. 2; and Fig. 13 is a schematic plan sectional view taken substantially along the line 13—13 in Fig. 2 and showing certain steam and water pipe connections and associated grooves.

The invention contemplates a substantially continuous process of sterilizing a food product which may be of the discrete particle type such as a whole grain corn, peas, diced carrots, beets, beans or similar materials and this is done by treating a quantity of the product in batches.

In the more detailed description which follows there is given as an example one way of carrying out the method steps. In this example the canning of corn is selected and is treated in minimum batch form, that is, each batch is sufficient for one can and is separately treated. Obviously a batch could include sufficient corn to fill several cans. Each single can batch when sterilized and cooled is immediately filled into a can which has just been made sterile. The can is hermetically sealed in the least possible time.

Where the larger batch of product is treated an additional step relating to the dividing of the batch into smaller units before filling into individual cans will be necessary. Ordinary filling machines properly protected against contamination and sealed against atmosphere will answer such purposes and will not be further discussed as such change in procedure will be obvious to one skilled in the art.

From the time a batch of material is segregated from the mass or supply of such material until it is finally sealed in the can it is confined out of communication and is cut off from the atmosphere and is held under various pressures depending upon the particular step in this cycle treatment. It is also treated throughout the process under sterile conditions and a cardinal principle which is followed in the treatment in the prevention of contamination at each and every stage of operation.

Considered from the standpoint of the product, the first step is the segregating of a batch or predetermined quantity, in the present instance a single can charge, from the supply of the product and then the other steps proceed in their natural sequence. It will be understood, however, that during any one operation or step in the process other steps are taking place at the same time. Naturally, therefore, the different phases of the description must needs overlap in point of time. In the description that follows an attempt will be made to briefly bring out this simultaneous treatment by digression at certain parts of the main description which will proceed with the minimum interruption from the segregating of the single can batch of corn from the supply reservoir through to its final hermetic closure within the can.

The drawings illustrate an organized apparatus for carrying out the invention in a preferred series of method steps and on a food product such as whole grain corn. In the exemplification herein illustrated and described a hopper *a* (Fig. 2) is moved under and is filled with the corn which is contained within a supply reservoir *b*, (see also Fig. 8). The reservoir may be closed at the top but is not airtight. This hopper when ready to receive the single can batch has already been cleaned and steam treated. The cleaning of the hopper will be fully considered at a later time.

During the filling of the hopper low pressure steam is caused to pass up from below and this steam continually flows through and around the food particles which are then entering into and around those which are already in the hopper as well as through the supply mass in the reservoir. Since the corn in the reservoir is not hot there will be little need for venting of the steam. However, venting may take place around the sides of the loosely fitting reservoir cover. The filling of the hopper with its predetermined quantity or single can batch is shown in Fig. 8.

The hopper *a* when filled is cut off from the supply reservoir *b* being moved so that its top is out of alignment with the filling hole of the reservoir. Provision is made, however, for steam to continue to pass up through the hopper and to escape from above, this time by way of a channel which has no connection with the reservoir. This may be said to be the beginning of the sterilization of the batch of corn in the hopper and the degree of sterilization will depend upon the temperature of the steam used at that time and necessarily such steam will be under a pressure. The steam treatment of the corn while in the hopper is shown in Fig. 2 and requires a substantial time, somewhat less than half of the entire process, as will be more definitely pointed out hereinafter.

A perforated hopper or sieve plate *c* provides the bottom for the hopper during the time the hopper is being filled and also while the steam is subsequently circulating through the charge of corn within the hopper. It is through the perforations of this plate that the low pressure steam enters the hopper.

The filled hopper, after its steam treatment, is next moved away from the perforated plate *c* and is brought over the top of and in alignment with a filling tube *d*. During this hopper transfer steam ceases to flow into the hopper from the perforated plate *c*. The corn now discharges by gravity into the tube and at the same time steam passes up from the bottom of the tube and flows through the descending corn. The steam escapes into an upper chamber *e* adjacent to the reservoir *b*. Fig. 7 shows the passage of food from hopper to tube.

Filling tube *d* is partially or fully closed at its bottom by a perforated tube slide *f* and it is through the perforations of this slide that the low pressure steam enters the bottom of the tube. The major part of the sterilization of the corn takes place while in the filling tube *d* and is carried on in stages, this phase of treatment consuming about one-seventh of the time of the total cycle of the entire treating process as will be hereinafter more fully explained.

Leaving for the present this feature of operations on the segregated charge of corn now in the filling tube, consideration will first be given to steps which take place relative to the empty hopper *a*. It will be understood, however, that the operations on the corn in the filling tube continue without interruptions.

While the hopper is discharging the corn into the filling tube *d* a cleaning operation is taking place on the perforating hopper sieve plate *c*. This cleaning of the perforated plate *c* is shown in Fig. 7 and will first be considered.

A pin cleaning device *g* is used for this purpose. This device includes a plurality of pins, one for each perforation. These pins are mounted upon a movable member. The pins are normally out of and spaced below the perforations of the sieve openings of the hopper plate *c* but are in vertical alignment therewith at all times. The pins are in their normal position when the hopper is being filled with corn from the reservoir *b* (Fig. 8).

It is while the hopper is in position over the filling tube *d* as has just been described that the pins of the cleaning device *g* are raised and pushed through the perforations of the plate *c* (Fig. 7). This action tends to force out any food particles that may have lodged in the perforations. During this cleaning step of punching out the sieve openings steam under pressure is supplied to the space below the sieve openings of the plate *c* and this steam escapes upwardly through the openings following which water and then a mixture of steam and water is caused to flush through the perforations and to carry out any food particles which are pushed up through the sieve openings.

Following the cleaning of the plate *c* the empty hopper *a* is moved away from and out of alignment with the filling tube *d* and thereupon follows a cleaning of the hopper. This comprises several cleansing phases including the washing out with water and steam before the hopper is brought again into filling position for a subsequent batch of corn. When the empty hopper *a* therefore is moved back over the perforated or sieve plate the holes in the plate are clean and it is in sterile condition.

The empty hopper is now aligned and is directly over the perforated plate *c* and the pin cleaning device *g* is in its lowered or normal position. Water is next brought into the hopper from the top and washes down the sides and through the plate perforations. Any particles of corn which do not flow through the sieve openings are left on top of the sieve plate. This leaves the hopper and the hopper bottom clean although there may be some corn particles left on top of the bottom plate as just mentioned. The washing of the hopper is illustrated in Fig. 9.

The water drains off and then steam is caused to circulate through the hopper and plate perforations being brought in from the bottom and vented at the top to atmosphere. This conditions the hopper for receipt of its next charge of corn. Description of operations upon the charge of corn in the filling tube *d* will now be resumed.

Simultaneously with the removal of the hopper *a* from its alignment with the filling tube *d* a filling and discharge plunger *h* is moved over the top of the filling tube. It is brought into alignment with the filling tube at the same time that the hopper aligns with its perforated or sieve plate *c*. The filling tube, it will be recalled, contains its charge of corn through which steam is flowing from the perforations of the slide *f* which at that time forms the bottom of the tube.

While the steam continues to enter the corn from below, the movement of the hopper *a* and the aligning of the plunger *h* over the tube just described cuts off communication with the upper chamber *e* and positions the parts so that the top of the filling tube opens into a middle chamber *i*. The plunger *h* then moves down into the top of the filling tube.

The upper end of the mouth of the tube is slightly flared and the rising steam escapes around the lower end of the plunger and enters the middle chamber *i*. At about the same time that the plunger comes into the flared end of the tube the steam pressure is increased. Continuing the consideration of the canning of corn as an example the increased steam pressure at this stage may amount to thirty pounds and with a corresponding temperature of 274° F. and this steam still escapes around the bottom of the plunger and enters the middle chamber *i*. Provision is made for venting the chamber at this time so that there is a circulation of steam through the corn mass and any air that might have entered chamber *i* is removed.

The plunger carries a piston ring near its lower end and when the plunger moves far enough into the tube this ring passes below the bottom of the flare of the mouth of the tube and enters the straight bore. The fit of the piston ring within the straight bore of the tube provides a steam seal blocking off any escape of the steam at that time from the top of the tube.

In other words, the filling tube with its charge of corn is cut off from the middle chamber *i*, but this sealing does not take place until a higher temperature and pressure of steam is introduced into the filling tube. Steam at fifty pounds pressure and at a temperature of 297° F. starts entering the corn mass before the tube is sealed by the plunger. The corn confined within the tube is now subjected to several steps or stages of increasing temperature all taking place within the sealed off tube, the steam entering from below through the perforations of the tube slide *f*.

Th first of these sealed-off sterilization steps has already begun, as just described, by steam at the pressure of fifty pounds and temperature of 297° F. This continues for a few seconds and then the corn within the tube is subjected to more steam pressure and higher temperature, i. e., the steam entering the corn is at sixty pounds pressure and at a temperature of 307° F. Following a few seconds of this treatment the steam pressure is further increased, for example, to sixty five pounds of pressure and at 312° F. temperature. These sterilization steps at increasing pressures and temperatures complete the sterilization of the product in a remarkably short time.

Preferably throughout all of the sterilization steps just mentioned and also at and immediately following the filling of the corn into the filling tube, the latter is heated from the exterior, this being in addition to the heating by means of the live steam entering directly into the corn through the perforations of the slide *f*. To effect this exterior heating the tube *d* is surrounded by a space which constitutes a tube jacket *j*.

Through this space steam is circulated at temperatures and under pressures which correspond at any given time in the sterilizing steps to the temperature and pressure within the filling tube. The walls of the tube are relatively thin and this provision of having the same temperature on both sides of the tube wall prevents heat losses by conduction and insures quicker sterilization action.

From the time the plunger *h* seals off the top of the heating tube and continuing throughout the different stages of sterilization of the corn within the sealed tube steam is introduced in the middle chamber *i* and at the beginning the chamber is rapidly brought to fifty pounds of pressure and the entering steam is then at a temperature of 297° F. This high pressure will be maintained in the chamber until after the sterilization of the corn is completed.

At the end of the high pressure and high temperature sterilizing period the steam entering into the product from the bottom of the filling tube *d* is cut off. The steam which has been circulated through the tube jacket *j* during this period is also cut off and cold water is then circulated through the jacket. This drops the temperature in the corn and condensation of steam within the corn mass immediately follows.

While circulation of cold water through the jacket continues to reduce the temperature of the corn in the tube conditions are immediately established for draining off the condensation. This drainage is done in two stages, the first stage by way of a pressure relief valve which is set at forty five pounds pressure. At the end of the first drainage step the corn mass will have dropped in temperature to about 291° F. and there will be forty five pounds pressure within the tube.

Circulation of cooling water within the tube jacket continues and the temperature of the corn is further lowered. In this second cooling stage condensation resulting from the drop in temperature of the corn will be drained from the tube, this time by way of a twenty pound pressure relief valve.

Near the end of this stage of cooling the perforated slide $f$ closes so that perforations are no longer at the bottom of the tube. This action also cuts off further drainage, the corn mass now having been reduced in temperature to about 260° F. and with a pressure of twenty pounds.

Following the closing of the slide circulation of water through the tube jacket continues and the corn within the tube continues to give off heat. As the corn comes below a temperature of 212° F. a negative pressure is generated within the tube. The tube is sealed at both top and bottom at this time and is further protected against contamination as will be hereinafter fully described.

At the end of the cooling period the sterilized corn is ready for the can. The can into which the sterilized batch of corn is to be placed has already been sterilized and consideration will now be given to this phase of the process.

The empty open top cans designated by the letter $k$ (Fig. 1) after passing through an outer can entrance valve $l$ are introduced into a can sterilizer $m$ wherein steam under proper pressure and temperature sterilizes all surfaces of the can both inside and out. An inner can valve $n$ next transfers the sterile empty can from the can sterilizer and places it into a filling, brining and closing chamber $o$.

Saturated steam at low pressure, for example at one pound, or sterile gas at the same pressure may fill the chamber. In some instances the chamber may be vacuumized to a high degree of vacuum, it being necessary to protect the food in the heating tube when under vacuum from any bacterial contamination. It is while in this chamber that the sterile can receives the charge of sterilized corn which has just completed its cooling cycle.

As best shown in Fig. 2 the sterile can moves beneath the bottom end of the filling tube and when in proper position the slide member $f$ moves back so as to fully open the bottom of the tube by aligning a discharge opening therewith. Thereupon the corn is pushed down into the can by descent of the plunger $h$.

The filled can with its charge of sterilized corn and still in the chamber $o$ may next pass to a briner $p$ if the product is to be brined, as in the case of corn. The briner $p$ is hermetically enclosed within the chamber $o$.

After receiving the desired brine the can is hermetically sealed while still in the chamber $o$. Any suitable seaming or closing mechanism may be used for this purpose, the letter $q$ designating such a device (Fig. 1).

Can covers for closing the cans must be first sterilized and then introduced into the chamber $o$ for the closing machine $q$. Such covers are fed in any suitable manner, first through a sterilizing device $r$ which is mounted in or adjacent to the chamber $o$. Device $r$ sterilizes the cover and the sterile cover thereupon enters the chamber $o$. It is then brought into position on the filled can for the can closing or sealing operation, this being effected in any suitable manner.

The sealed can is then discharged from the chamber $o$ without delay. In order to permit such a discharge without breaking the seal of the chamber $o$ a discharge valve $s$ may be used. In some instances the can may not be sufficiently cooled when it leaves the chamber $o$ and obviously further cooling may subsequently be had.

Reverting back to conditions affecting the perforated tube slide $f$, it will be recalled that before the sterilized and cooled batch of corn within the filling tube $d$ is ready for discharge into the sterilized can, the tube slide was moved to carry its perforations out of alignment with the bottom of the tube. Further movement now brings a discharge opening formed in the slide in alignment with the plunger $h$, (Fig. 2) following which the corn is filled into the can. It is at such a time that the perforations of the slide are brought under and aligned with a pin cleaning unit $t$ which is constructed substantially the same as the pin cleaning device $g$.

Furthermore it is during the filling of the corn into the can and as the descending plunger $h$ is traversing the filling tube $d$ that the perforations of the slide $f$ are cleaned by the cleaning unit $t$. In this cleaning action sterile water and steam are forced through the holes. Then the pins of the unit are moved down into the perforations of the slide (Fig. 2). This forces out any food particles that may have lodged in the holes. This is followed by more washing by means of sterile water and steam. For this purpose the water and steam may be at 260° F. temperature. The water, condensate and fine food particles are then drained from the slide.

In the lowermost position of the plunger $h$, this being when the can $k$ has received its full charge of corn, its bottom end acts as a topper for the can and in this position extends through the opening of the tube slide $f$. The plunger then moves up out of the slide opening and at the same time the tube, plunger and slide are moved away from the filled can.

Sterile water which may be heated if desired, is now forced through the slide opening and into the empty filling tube under a suitable pressure, which may be for example twenty pounds. This water fills the tube and flows against the bottom of the plunger while it is still ascending, as shown in Fig. 10.

Just before the piston ring carried by the plunger $h$ passes into the flared mouth at the top of the filling tube the flow of water is cut off but the rising plunger continues its ascent. As the plunger opens up the top of the filling tube the sterile water in the middle chamber $i$, which is under a steam pressure of fifty pounds, forces its way into the tube and at the same time the bottom of the tube is connected with drainage (Fig. 11). Accordingly the tube is emptied and all of the hot water in the middle chamber is evacuated by way of the tube and drainage.

During the last portion of the draining operation, the perforated slide $j$ is moved to bring its perforations in alignment with the bottom of the chamber. The steam which has been supplied to the middle chamber $i$ under its fifty pounds of pressure is now cut off and as the filling tube is finally emptied the pressure of the steam within the chamber $i$ is relieved, the tube and the perforated slide being thus left in a sterile condition and ready to receive its hopper full of corn. This completes the cycle of operation.

Consideration will now be given to the mechanical features of the apparatus herein illustrated for the practice of the invention. In a broad sense the apparatus comprises a stationary frame 21 (Figs. 1 and 2), which for the most part is cylindrical in shape and a cylindrical movable housing 22 mounted on the frame. These parts are somewhat massive being adapted for the canning of corn with a production capacity of about 150 or 160 cans of fully treated product per minute.

The movable housing carries some eighty slide units 23 each of which is radially disposed and each is in some stage or step of the treatment at any particular position throughout its rotation around the frame 21. Each slide unit may be considered as a compound or double unit for each carries one hopper $a$ and one filling plunger $h$ and in addition to the rotative movement with an associated filling tube $d$ is movable relative to the tube. At any one time therefore a unit is functioning in its duplex capacity, some step in the treatment taking place as to the hopper and another step as to the filling tube.

The machine frame 21 is extended at one side into a rectangular section 24 and it is in this section that the empty cans $k$ are introduced into the machine and after filling are sealed and then discharged therefrom. The walls of the frame section 24 provide valve seats for the outer entrance valve $l$ (Fig. 1), the can sterilizer $m$ and the inner or chamber valve $n$.

A can entrance chute 26 directs the empty open top cans $k$ into a pocket of the rotary valve $l$. The valve $l$ introduces the can into a pocket of a rotatable turret 27 which is located in the sealed chamber of the sterilizer. While the cans are carried around through the sterilizer by the rotating turret 27 they are subjected to high temperature steam which circulates within the sterilizer chamber. This steam may be introduced into the chamber by an inlet pipe 28 and removal of steam and condensate may be made by way of an outlet pipe 29. The sterilizer $m$ may be of any suitable construction and as its construction features form no part of the invention further description is considered unnecessary.

The sterilized can $k$ is removed from the pocket of turret 27 and is transferred by the rotating valve $n$ into the filling, brining and closing chamber $o$. The valve $n$ places the can between spaced prongs 31 of a horizontally disposed continuously movable endless conveyor chain 32. This chain operates over a drive sprocket 33 and over an idler sprocket 34. The can is placed above the chain as it moves around the idler sprocket and is then kept in a proper line of travel, i. e., over the chain by an inner guide bar 35 and an outer guide rail 36. The can is thus advanced between the sprockets 34, 33 and at one position in its travel it receives its fill of sterilized corn. This will be fully explained at the proper time.

The stationary frame 21 is formed with a central, cylindrical vertically disposed wall 41 (Figs. 1 and 2) which at its bottom merges into a horizontal wall 42. In its section 24 the frame wall 42 provides the floor for the filling, brining and sealing chamber $o$ and this wall carries a horizontal runway 43 (Fig. 2) along which the cans travel when advanced by the chain 32. On the opposite or return run the chain is carried in a groove 44 cut in the wall 42. It is also the wall 42 that carries the conveyor sprockets 33, 34 and their shafts.

Just above the wall 42 at the base of the cylindrical wall 41 a spaced horizontal wall is an integral part of the frame and in the section 24 of the frame carries a chamber top plate 45 the outer edge of which is mounted on top of an outside wall part 46. This top plate in the front of the machine and parts of the wall 42 are flush on their upper surfaces and provide support for the movable housing 22 which surrounds the cylindrical frame part 41. The top plate also forms the roof for the chamber $o$ and is tightly sealed by means of suitable packing 47.

The cylindrical wall 41 carries at its top a bowl like member 51 (Figs. 1 and 2) which is formed with a middle web 52 and a vertically disposed peripheral wall 53. It is inside of the member 51 that the reservoir $b$ is disposed (Figs. 1 and 3).

The reservoir $b$ is oval in plan and is formed as a surrounding shell 54 which contacts with the inner face of the peripheral wall 53 at one side this being on the side opposite to the frame part 24. A sloping bottom 55 of the reservoir shell dips down toward the outer side at its zone of contact with the peripheral wall. This bottom directs any food particles passing through the reservoir to an elongated slotted opening 56 cut through the bottom. The reservoir shell is held in fixed position by straps 57. A cover 58 is disposed on the upper edge of the shell part 54 and through the cover, a supply of the raw product may be introduced in any suitable manner to replenish the supply of product in the reservoir.

The movable housing 22 comprises a bottom horizontal web 61 (Fig. 2) from which extends a vertically disposed circular lower wall 62 (see also Fig. 1). The wall 62 is enlarged at spaced intervals to provide the surrounding tube jackets, and this wall also carries the filling tubes $d$. There are thus eighty of these tubes with their jackets $j$.

The lower web 61 carries a ring gear 63 and it is through this medium that the movable housing and all parts carried thereby are continually rotated. A drive pinion 64 meshes with the gear and provides for proper transmission of the necessary rotative power.

At the top, the wall 62 merges into an annular intermediate section 65 wherein is located the slide units 23. This intermediate section is cut across in wall pockets 66 having parallel sides and adjacent pockets are separated by a spacer wall 67. Each slide unit has free radial movement within its pocket but its sliding surfaces provide steam tight joints. There is a middle chamber $i$ for each unit and each chamber is located in part in its associated pocket 66.

The top wall of the intermediate section 65 is in horizontal alignment with the lower face of the stationary web member 52 and the slide unit 23 has a steam tight sliding fit at this place. At its outer end the pockets 66 are sealed by a horizontal flange 71 of an upper annular housing member 72. The periphery of the flange 71 is bolted tight to the intermediate section and is made steam tight by a packing 73.

The housing 72 confines the upper chamber *e*, the stationary wall part 53 providing the inner boundary of the chamber. Thus it will be evident that there is only one upper chamber *e* for all of the slide units 23 and this chamber is annular in shape and surrounds the stationary inner bowl like member 51. A ring cover 74 is bolted at its outer periphery to the top of the housing 72 and at its inner rim has a sliding fit on a flange 75 formed at the top of the wall 53. A packing strip 76 makes this sliding fit steam tight. A check valve or steam vent 77 (Fig. 7) may be placed in the ring cover 74 to prevent too great an accumulation of pressure in the chamber *e*. The maximum pressure setting of the check valve may be one pound, for example.

Each slide unit 23 (Figs. 1 and 2) consists of a rectangular block 81 the sides and bottom of which are at all times sealed in a sliding steam fit within the parallel side walls and the bottom wall of the pocket 66 in which the unit operates. In a similar manner the top of the block has a close sliding steam fit with the under surface of the central web 52 at its inner end and with the under surface of the flange 71 of the housing 72 at its outer end.

Each block 81 centrally of its radial dimension is cut through from top to bottom with a vertically extending opening 82 which in shape is as the frustrum of an inverted cone. This opening constitutes the hopper *a* and its volume therefore, in this present embodiment, is sufficient to hold a single can batch of the product.

Just back of the opening 82 a vertical bore 83 is cut through the block and the filling plunger *h* is slidably carried in the bore. The inner end of the block is recessed at 84 and a vertical bore 85 passes through a part of the block and extends from the bottom of the recess to the bottom face of the block. The bore 85 is used in cleaning out the perforated sieve plate *c* as will be hereinafter fully explained.

The outer end of the block 81 is also recessed as at 86 and this recess forms part of the middle chamber *i*. It extends inwardly and surrounds the plunger *h* as clearly shown in the drawings. The plunger *h* is vertically movable in the bore 83 and during such movement is held against rotation on its own axis by a feather 87 which is held in the block and which projects within a featherway formed in the inner side of the plunger.

Plunger *h* is raised and lowered within its bore 83 by cam action and for this purpose carries a cam roller 88 rotatably mounted on a stud 89 threadedly engaged in the top of the plunger. This cam roller traverses a cam groove 90 cut in the peripheral wall 53 as the movable housing 22 and parts carried thereby rotate around the stationary frame 21.

The block 81 is moved from an inner hopper filling position (Fig. 8) to a hopper discharge position shown in Fig. 7. This movement is effected by a cam groove 91 cut in the bottom surface of the stationary web 52. A cam roller 92 is rotatably mounted on a stud 93 and the latter is screwed into the block 81 at its inner end. As the slide units 23 are carried around by the continuously moving housing 22 the roller 92 traverses the cam track and is moved in and out in proper time.

Each block 81 is in its inner position when it passes beneath the reservoir *b* and its hopper opening 82 moves along and under the slotted opening 56 in the reservoir bottom 55. The filling of the corn into the hopper *a* (Fig. 8) takes place during this movement of the hopper along the reservoir opening.

When the block 81 is in its inner position it is also directly over the perforated sieve plate *c*. Each sieve plate comprises a spaced double web member which is set into a vertical bore 94 formed in the intermediate housing section 65 just below the bottom of the pocket 66. Its upper web 95 is flush with the bottom floor of the pocket. The web 95 is perforated and these perforations align with similar perforations formed in a lower web 96. The space between the webs 95, 96 connects with the outer end of a horizontal channel 97 which extends inwardly to the stationary wall 41 of the stationary frame 21.

It is through the channel 97 that the low pressure steam is brought into the space between the perforated web sections 95, 96 and the steam escaping up through the holes of the web 95 passes on up into and through the hopper *a* and on up through the corn in the reservoir *b* as has already been described.

The pin cleaning device *g* is also located in the bore 94 and includes a head 98 on which is carried cleaning pins 99. When in non-cleaning position, as during filling of the hopper the head is at the bottom of the bore 94 and the tops of the pins are flush with the top surface of the lower web 96. The head 98 is formed with a stem 101 which extends down through the frame and into a space 102 located just inside of the wall 62.

A lever 103 is located in the space and is pivoted at 104 on a depending bracket 105 which extends down from the housing part 65. The outer end of the lever is slotted as at 106 and this provides a loose connection for a pin 107 carried on the stem 101.

The inner end of lever 103 carries a cam roller 108 which operates in a cam groove 109 formed in the peripheral surface of the stationary cylindrical wall 41. As the movable housing and parts carried thereby rotate around the stationary central frame the cam roller traverses its cam track and the lever is rocked on its pivot to raise the pins 99 at the proper time to clean out the perforations in the web 95.

Consideration will now be given to the perforated tube slide *f* which is an associated part of each filling tube *d* and reference should be had to Figs. 1, 2 and 3. Each tube slide is moved across the top plate 45 in front and across the horizontal frame wall 42 at the sides and rear as the movable housing 22 turns around its stationary frame 21. The under face of the horizontal web 61 is cut into by rectangular slots 111 there being one slot for each filling tube *d*. Each rectangular slot is radially disposed and is centrally located as to the longitudinal center of the tube. Such a slot provided a close fitting sliding seat for the tube slide *f*.

Each tube slide *f* is pierced through intermediate its longitudinal axis with perforations 112 and near its outer end with a circular opening 113. This slide has an outer position (Fig. 8) where its perforations 112 are aligned beneath the filling tube *d*. It also has an inner position (Fig. 2) where its circular opening 113 is aligned beneath the filling tube *d*. An intermediate position shuts off the bottom of the filling tube (Fig. 10).

Slide *f* is cam controlled and for this purpose carries at its inner end a cam roller 114 which is mounted on a stud 115 threadedly secured to and depending beneath the slide. The cam roller 114 operates in a cam groove 116 (see also Fig. 3) cut in the upper surface of the top plate 45 and in the frame wall 42. As the movable housing 22 revolves around its stationary frame 21 roller 114 traverses the cam track 116 and the slide is thus moved into its different positions.

Just back of or inwardly from the filling tube d is located the tube slide pin cleaning unit t. This unit is of the same construction as the pin cleaning device g already explained and is just below and in vertical alignment therewith. The unit is contained within a vertical bore 121 and comprises a perforated web member 122 which is set into the bore and with its lower surface flush with the top of the slide f. Cleaning pins 123 project down from a head 124 also contained within the bore 121. The perforations in the web 122 act as guides for the pins which are adapted to be lowered through the perforations 112 of the slide f when the latter is in its inner position.

The head 124 is formed with a stem 125 which extends up through an opening in the frame wall and into the recess 102. A lever 126 is located in this recess and is pivoted at 127 on the bracket 105. Its outer end is slotted for a loose connection with a pin 128 carried by the stem 125 and its inner end carries a cam roller 129. As the movable housing 22 and parts carried thereby revolve around the stationary wall 41 the cam roller 129 traverses a cam track 131 cut in the periphery of the wall and in this manner the pin cleaning unit g receives its proper actuation.

Having fully described the principal parts of the apparatus, attention will now be directed to the functioning of these parts and to the application of steam and water in the different places where needed. The complete cycle of operations will again be briefly mentioned and some idea of relative time values will be set forth. It should be understood that such time figures are by way of illustration only inasmuch as the kind of product being treated will largely dictate exact time values. Even in the treatment of the same product, such as corn, the variety, freshness, and other characteristics will affect the timing of the different steps in its treatment.

In the plan sections of Figs. 1, 3, 4, 5 and 6 where the relative time values can best be seen, the same positions throughout the cycle where a change in operation occurs are indicated in the figures by the same designated and located radial dot and dash lines.

For the description that follows the filling of the hopper a is arbitrarily chosen as a point of beginning. The same slide unit 23 will be followed throughout its complete cycle which means for two revolutions of the movable housing on the stationary frame. When this slide unit moving in a clockwise direction (Fig. 1) passes the radial position a—a the filling of the hopper a with corn from the reservoir b begins. This filling continues until position b—b is passed. Fig. 8 shows this step. It takes two seconds to make the fill.

It will be recalled that low pressure steam is passing into the hopper by way of the perforation in the web 95 of the sieve plate c, the steam entering through the channel 97. The inner end of this channel at this time is in communication with an annular channel 132 cut in the periphery of the cylindrical wall 41. Fig. 5 shows the extent of channel 132 and also shows that the low pressure steam is fed to the channel by supply pipe 133.

After passing the position b—b the hopper contains its charge of corn, the hopper then having passed beyond the reservoir slot 56. Now begins the period of steam treatment of the corn while in the hopper and this continues for nineteen seconds or until the filled hopper reaches the position k—k (Fig. 5). Ten pounds pressure of steam at a temperature of 240° F. may be used for this treatment and this steam is introduced through the perforated web 95 (Fig. 2) into the hopper by way of the channel 97. The inner end of channel 97, during the movement of the hopper from position bb to kk, is in communication with a channel 135 cut in the periphery of the cylindrical wall 41. The channel 135 may be supplied with steam by way of spaced supply pipes 136 (see also Fig. 5).

Fig. 2 shows this steam treating operation and it will be observed that the steam passing up through the corn enters an annular channel 137 formed in the under face of the web 52. Fig. 6 shows that the channel 137 extends from position bb to position kk. Channel 137 emptied by a transverse port 138 which leads into a pipe 139. Thus circulation of steam is maintained by entering through the pipes 136 and exhausting by way of pipe 139.

Throughout this steam treatment the slide unit 23 with its hopper a is in its inner position, being so held by the cam track 91. After passing the position kk therefore steam is cut off from the bottom of the hopper which now with its charge of corn moves to its outer position. Fig. 6 shows the course of the cam track 91 that effects this movement. The outer position of the slide unit 23 is shown in Fig. 7. When this movement takes place the plunger h is in its highest position the cam groove 90 at this place being at its highest point. When the slide unit moves out it takes away the cam roller 88 from its cam groove 90 as shown in Fig. 7. In order to keep the plunger h in its raised position so that it can be returned to the cam groove, a spring pressed detent 141 is used. The detent is located in the slide block and its inner end engages in a groove 142 cut in the plunger opposite the feather 87 and this maintains the plunger in raised position.

Emptying of the corn next follows and as the corn discharges from the hopper a into the filling tube d (Fig. 7) steam passes up through the corn in both tube and hopper and passes on into the upper chamber e. This steam, which is at a pressure of ten pounds and at a temperature of 240° F. in the tube, enters through the perforations 112 in the tube slide f the steam coming through a pipe 145 and a passageway 146 which leads into an annular channel 147, formed in the horizontal frame wall 42. Fig. 3 shows the extent of the channel 147. The transfer of corn from hopper a to tube b consumes only about one and a half seconds. Then the slide unit is returned to its inner position.

It is while the slide unit is in outer position and during transfer of the corn from hopper to tube that the hopper sieve plate c is cleaned. This is shown in Fig. 7 which also shows the cleaning pins 99 being pushed through the perforation of the web 95. Before and immediately after steam and hot water flow in between the webs 95, 96 by way of the channel 97 which at this time passes in communication with a channel 151 formed in the stationary wall 41. Water and steam are brought into channel 151 by a pipe 152 and a passageway 153. The drainage, washing up through the opening 85 in the slide block 81 passes through the recess 84 and through the pocket 66 and out through a channel 154 formed in the wall 41 and thence through a passage 155 connecting with a pipe 156. Fig. 5 shows the extent and relative positions of the channels 151 and 154. The position l—l shows where this washing step is completed although the drainage by way of channel 154 may continue beyond that position.

The slide unit 23 is returned to its inner position during the travel from position l—l to position mm (Fig. 6) and the empty hopper a again comes to rest over the cleaned sieve plate c. Two things now take place, the empty hopper is washed out and the filling tube d with its charge of corn begins its steam treatments. The cleaning of the hopper a will first be followed and each operation covering the travel of the same from position mm back to the point of beginning aa will be noted before returning to position mm for consideration of the filling tube d.

Upon passing the position mm water is introduced into the hopper a from the top as illustrated in Fig. 9. From position mm to nn (Fig. 6) this water comes from a pipe 161, passes through a sinuous passageway 162 formed in the stationary wall 41 and web 52 and discharges into an elongated channel 163 cut into the under face of the web 52. An oblong perforated spray head 164 is set into the bottom of the channel and this spreads the water in a series of jets which strike against the walls of the hopper a and wash down any food particles which may be left in the hopper. The water and fine drainings pass out through the perforations in the web 95 of the sieve plate c and are carried out by way of the channel 97.

When the hopper is subjected to the spray of water from the perforated spray head 164 it is in heated condition and if the spray water used is above a normal boiling temperature the drainage will begin immediately since the pressure in the hopper will be above atmospheric pressure. If, however, cold water or water below the normal boiling temperature is used vacuum will be formed in the hopper and drainage of the spray water will be momentarily delayed until such a time as the vacuum can be dissipated.

At this time the inner end of the channel 97 is in communication with a channel 165 cut in the periphery of the frame wall 41. Channel 165 is connected by a bore 166 to a discharge pipe 167. The bore and pipe are also in the wall 41. Fig. 5 shows that the channel 165 extends from position m—m to a point about half way between positions n—n and o—o. In this washing period the water flows into the hopper for about two seconds and the total drainage period may be about three seconds. Any food particles too big to pass through the perforations of the sieve plate c remain at the bottom of the hopper.

The full drainage period of three seconds will obtain where hot water is used in the spray head and the drainage water will then be discharged from the hopper as soon as the channels 97 and 165 are connected. Where cold water is used, as explained above, it is first necessary to dissipate the vacuum in the chamber and this is done by air entering from below by way of the discharge pipe 167, bore 166 and channel 165. Obviously the time required for breaking the vacuum, however brief, will shorten the drainage period as suggested.

The water is cut off upon the slide unit 23 passing the position n—n but drainage continues since the channel 165 extends beyond that position, as already explained. This further drainage, following the cutting off of the water from above the hopper, is made possible by venting of the hopper from above. This venting is in effect during the passage of the hopper a from position n—n to a—a which consumes about four seconds. About one second of this time is consumed by passage of the hopper from the position n—n to the termination of the drainage channel 165.

As shown in Fig. 6 the hopper immediately upon passing position n—n moves under a channel 171 formed in the web 52. A passage 172 formed in the web connects this channel with a vent pipe 173. No cross section is shown of the hopper and the associated parts when it is passing beneath the channel 171 but it will be understood that this channel corresponds in structural details to the channel 137 and the passage 172 and pipe 173 are the counterparts mechanically of the passage 138 and pipe 139. The entrance of air into the hopper by way of the vent channel 171 and vent pipe 173 insures complete drainage of the wash water.

Immediately after the slide unit 23 passes the end of the drainage channel 165, the end of channel 97 registers with the low pressure steam channel 132 and steam entering through the perforations of sieve plate c in the bottom of the hopper prepares it for its next charge of corn. This steam escapes through the vent channel 171, passage 172 and vent pipe 173 until the position a—a is reached. This drives out the air from the hopper. Thus one revolution of the slide unit 23 is completed with the hopper a again reaching position a—a.

Returning to the filling tube d with its charge of corn which is passing into the first stage of steam treatment therein, with the tube at this time advancing from the position m—m to the position n—n. At this time the plunger h under the action of the track 99 moves down into the open flared top of the filling tube. When the slide unit 23 was returned to its inner position the cam roller 88 carried on top of the plunger h was again inserted into the cam groove 90. In its travel from m—m to n—n, which requires about two seconds, the plunger is moved into the flared mouth of the tube.

The plunger carries a piston ring 175 (Fig. 7) and this ring at the time the moving slide unit reaches the position n—n is just above the straight bore of the filling tube. This leaves about 1/64 of an inch clearance around and beneath the piston ring to permit escape of the steam which is entering the bottom of the filling tube through the perforations of the tube slide f. This position of the plunger is not illustrated in detailed section in any of the figures of the drawings.

The perforations at the bottom of the filling tube which are in the tube slide pass over a channel 176 (Fig. 3) which is formed in the upper surface of the frame part 42. This channel is connected with a passageway 177 cut in the frame wall which communicates with a steam pipe 178. The steam in the tube supplied by the pipe 178 is under a pressure of thirty pounds and at a temperature of 274 degrees and is maintained for about two seconds. This insures that the higher steam pressure entering into the filling tube and passing through the corn mass therein escapes through the small clearance opening just beneath the piston ring 175 of the plunger h, carrying with it the last vestige of air or gas, if any entered with the corn. In escaping from out of the top of the filling tube the steam enters the middle chamber i.

At this stage of operations the middle chamber i is vented to the atmosphere. This is done in the following manner. As illustrated in Fig. 12 a passageway 179 is cut in each spacer wall 67 and the outer end of the passageway opens into the outer end of the pocket 66. The walls of this pocket surround in part the chamber i.

The inner end of the passageway 179 as it moves between positions l—l and half way between n—n and o—o communicates with an annular peripheral channel 180 (see also Fig. 13) cut in the wall 41 of the stationary frame. This is a vent channel which may open up to the inside of the wall 41 and in this way the steam, with any air or other gas entering the middle chamber from the filling tube, is vented.

Provision is made for maintaining a pressure of thirty pounds of steam with its corresponding temperature of 274° F. within the jacket j surrounding the filling tube d during passage of the parts from m—m to n—n. For this purpose steam enters the jacket through a passageway 181 (shown in Fig. 8) cut through the lower part of the intermediate frame section 65. The passageway 181 during the movement of the slide unit between positions m—m and n—n communicates with a peripheral channel 182 (Fig. 4) which is cut in the outer wall of the cylindrical frame section 41. This channel is connected to a steam pipe 184 which delivers the proper temperature and pressure of steam to the upper part of the jacket.

A passageway 185 (indicated in Fig. 8) extends from the bottom of the jacket j through the lower horizontal part of the frame section 65 and terminates at the inner wall of the removable part. During this passage of the slide unit between m—m and n—n the inner end of the passageway 185 communicates with a peripheral channel 186 cut in the outer wall of the cylindrical frame section 41 (see also Fig. 4). This channel 186 is connected to a pipe 188 by means of which the steam condensate is led away from the tube jacket.

During the next movement of the rotating housing relative to the stationary frame, that is from position n—n to o—o (Figs. 3 and 4) the steam pressure is increased in both the filling tube d and in its jacket j. At this time the perforations in the bottom of the filling tube pass over a channel 191 (Fig. 3) which is connected by a passage 192 with a steam pipe 193. This pipe delivers steam at a pressure of fifty pounds and at a temperature of 297° F. and this condition obtains for about two seconds.

Up until about the half way point in this travel between these positions a part of the steam escapes through the clearance opening between the bottom of the piston ring 175 on the plunger h and the top of the cylindrical bore of the filling tube d but as this half way point is reached the plunger h is lowered sufficiently to enter its piston ring 175 into the cylindrical bore of the filling tube, thus blocking off any escape of steam from the top of the tube.

Just before reaching this half way point the vent connection to the middle chamber is closed, Fig. 13 showing that the channel 180 terminates just short of this half way point. After the half way point is passed no more steam enters the middle chamber i from the filling tube d since the latter is then closed by the plunger h.

Immediately following, however, high pressure steam is introduced into the middle chamber, this steam being at a pressure of fifty two pounds and at a temperature of 300° F. Putting the middle chamber under this high pressure is done in the following manner. The inner end of the passageway 179, just after passing the point at which the venting of the filling tube terminates, comes into communication with a peripheral channel 194 (Fig. 13) cut in the outer wall of the frame part 41. Channel 194 extends over 270° or around the frame wall to the position k—k.

Pipes 195 joining with the channel 194 at different places introduce and maintain this high steam pressure in chamber i as long as the chamber is in communication with the channel 194 which is for about twenty two seconds.

During this same movement, i. e., from n—n to o—o, steam in the jacket j is also increased to a pressure of fifty pounds and with a temperature of 297° F. Fig. 4 illustrates this operation. During such movement the inner end of the passage 181 communicates with a peripheral channel 196 cut in the outer surface of the cylindrical stationary wall 41. This channel is connected to a steam pipe 197 which delivers steam at the proper pressure and temperature to the upper part of the tube jacket j. At the same time the inner end of the passage 185 communicates with a peripheral channel 198 which is connected with a pipe 199, thus permitting escape of the steam condensate from the tube jacket.

During the passage of the slide unit 23 between the position o—o and a—a sixty pounds of steam pressure is introduced into the closed filling tube d with its confined charge of corn, this being as before through the perforations at the bottom of the tube. At the same time a corresponding steam pressure is circulated through the jacket j of the filling tube.

As illustrated in Fig. 3 the perforations at the bottom of the filling tube now pass over a channel 201 formed in the wall 42 which is connected by a passage 202 with a steam pipe 203. This pipe introduces steam into the closed tube at a pressure of sixty pounds and at a temperature of 307° F. and such is maintained for about two seconds. At the same time the same pressure and temperature of steam are maintained in the jacket j and reference should be had to Fig. 4.

The inner end of the passage 181 now communicates with a peripheral channel 205 which is formed in the outer wall of the frame part 41. This channel connects with a steam pipe 206 through which steam at a desired pressure and temperature is introduced into the top of the jacket. At the same time the inner end of the passage 185 communicates with a peripheral channel 207 also cut in the frame wall and connected with a pipe 208. This steam at sixty pounds of pressure is held in the steam jacket while steam is introduced into the bottom end of the closed filling tube.

The slide unit 23 has now reached its starting point and the description that follows relates to the second revolution of the slide unit and particularly is concerned with the treatment associated with the filling tube d as it makes its second revolution around the stationary frame part of the apparatus.

In the passage between a—a and b—b the perforations at the bottom of the filling tube $d$ pass over a channel 211 (Fig. 3) which is connected by a passage 212 with a steam pipe 213. This pipe introduces steam into the bottom of the closed and filled tube $d$ at a pressure of sixty five pounds and at a temperature of 312° F. This is the last stage of the sterilizing of the food within the filling tube. At the same time the same temperature and pressure of steam circulates through the jacket $j$ surrounding the filling tube. This last stage of steam treatment consumes about two seconds.

To obtain the proper circulation of steam in the steam jacket during this movement between the position $a$—$a$ and $b$—$b$ the inner end of the passage 181 communicates with a peripheral channel 215 formed in the outer surface of the wall 41 and which is connected with a steam pipe 216 by means of which steam at the desired pressure and temperature is supplied to the upper part of the jacket. At the same time the inner end of the passage 185 registers with a peripheral channel 217 (Figs. 4 and 8) formed in the outer wall of the frame member 41. This channel is connected with a pipe 218 which allows for escape of steam condensate from the bottom of the tube jacket $j$.

This completes the heating feature of the sterilizing operation and the next interval of time is concerned with the cooling of the product. Between the position $b$—$b$ and $c$—$c$ the perforations of the tube slide $f$ at the bottom of the filling tube pass over a channel 221 (Fig. 3) which is connected by a passage 222 to a drain pipe 223 in which is located a relief valve 224. This relief valve is set at forty five pounds pressure and any pressure over that is relieved through the valve and liquid is allowed to escape from the tube. This continues for about three seconds.

The reduction in pressure within the tube $d$ results from the cooling of the product within the tube which is brought about by the circulation of cold water through the jacket $j$ of the tube. For this purpose after passing the position $b$—$b$ the jacket passage 185 (Fig. 8) comes into communication with a peripheral channel 225 (Fig. 4) cut in the outer surface of the wall 41 and which is connected to a cold water pipe 226. This introduces cold water into the bottom of the tube jacket. At the same time the inner end of the passage 181 communicates with a peripheral channel 227 formed in the frame wall 41 and this latter channel connects with a discharge pipe 228. Circulation of cold water through the jacket from bottom to top continues through the various positions following the position $b$—$b$ until the position $g$—$g$ is reached so that cooling of the corn mass within the filling tube continues during this time which is about twelve seconds.

As the perforations at the bottom of the filling tube pass between position $c$—$c$ and position $e$—$e$ they connect with a channel 231 (Fig. 3) which is formed in the frame part 42 and this channel connects by a passage 232 with a drain pipe 233 in which is located a relief valve 234. The relief valve 234 is set at twenty pounds pressure and all pressures over that amount are allowed to dissipate through the relief valve and liquid continues to escape from the tube $d$. This relief phase lasts for about three seconds.

Prior to reaching the position $e$—$e$ the slide $f$ is moved to close off the bottom of the filling tube $d$. This is shown in Fig. 10. This is done by the cam track 116 which as illustrated in Fig. 3 extends inwardly from a position just in advance of position $d$—$d$ so that when the slide unit reaches the position $e$—$e$ the filling tube is completely closed at its bottom. It will be understood, however, that cooling still continues since the cold water circulation through the jacket $j$ of the filling tube is uninterrupted.

The slide unit just after passing the position $e$—$e$ and with the bottom of the filling tube $d$ closed by the slide $f$ comes over a channel 241 (Fig. 3) which is cut in the upper face of the frame wall 42. This particular position of the parts is not illustrated in detail in the drawings. The channel 241 is connected by a passage 242 with a pipe 243.

Cooling of the corn mass within the tube $d$ continues after the slide $f$ closes the tube. This cooling of the product while still in the tube may be brought to such a point that a vacuum is created in the tube. The pipe 243 therefore may be connected to a source of vacuum which is higher than any vacuum which may exist in the tube and in that event the channel 241 and the under side of the closed tube slide $f$ will be brought under vacuum.

In some cases a sterile, non-condensible gas such as air or nitrogen may be supplied through the pipe 243 to fill the channel 241 under the closed tube slide $f$. Such sterile gas when used would preferably be at a slight pressure, for example, one pound. In still other cases it may be advisable to fill the channel 241 with saturated steam at a slight pressure.

The channel 241 functions as a protection to the food in the heated tube against bacterial contamination. This is an added insurance as it will be understood that the closed slide $f$ substantially prevents the entrance of any bacteria into the product within the filling tube $d$.

The channel 241 terminates just short of position $f$—$f$ so that when the slide unit reaches that position all communication with the under side of the tube slide $f$ is terminated. In the passage of the slide unit from $f$—$f$ to $g$—$g$ some cooling will take place until the termination of the total cooling period of twelve seconds mentioned above.

The corn is now approaching the filling stage when it will be filled into the empty sterile can being conducted through the chamber $o$ by the conveyor chain 32.

As the slide unit passes from $f$—$f$ to $g$—$g$ the cam track 116 (Fig. 3) veers inwardly so that the tube slide $f$ is brought from the closed position shown in Fig. 10 to the filling position shown in Fig. 2. In this latter position the opening 113 formed in the tube slide $f$ is brought in register with the bottom of the tube $d$ so that when the slide unit reaches the position $g$—$g$ the bottom of the tube is fully open.

At this time the empty sterile can $k$ is moved beneath a slot 244 (see also Fig. 3) cut in the top plate 45 just over the conveyor chain and as the slide unit passes from positions $g$—$g$ to $h$—$h$ the cam track 90 acting upon the plunger cam roller 89 forces the plunger down through the filling tube $d$, this action forcing the charge of corn, which is now fully sterilized and sufficiently cooled, into the can as it passes along its straight line of travel. Fig. 2 of the drawings shows this filling step well advanced with over half of the corn having been at that time discharged into the can. The total filling time is about two seconds.

The filled can still being conveyed by the chain 32 is then passed under the briner $p$ (Fig. 1) and hereafter receives an end from the end sterilizer and can and end are then sealed toegther by the double seamer g. The chain thereupon introduces the now sealed and filled can into a pocket of the discharge valve s which removes the sealed can from the chamber o and discharges it into a suitable place of deposit which may be by a runway as shown. The chamber o is supplied with its steam or sterile gas by a supply pipe 245 (Fig. 1) and circulation of the same may be obtained if desired by an exit pipe 246.

While the can is being filled (Fig. 2) the pins 123 of the pin cleaning device t are inserted into the perforations 112 of the tube slide f. Before and following this operation steam and water are caused to flow through the holes and the water is drained away.

During this action which is just after the slide unit has passed position g—g the slide perforations pass over a channel 247 (Figs. 2 and 3) cut in the chamber top plate 45 and this channel extends nearly to the position h—h. It connects by a passage 248 with a drain pipe 249. Water passing through the perforation of the tube slide f is thus drained off by way of the pipe 249.

The space above the tube slide and just beneath the web member 122 is always connected with a passage 251 (Fig. 2). The inner end of this passage divides into two branches and during travel of the slide unit between g—g and h—h, which consumes about two seconds, the end of the upper branch comes in communication with a peripheral channel 252 (see also Fig. 4) formed in the frame wall 41. This channel connects with a steam pipe 253 by means of which steam, at about fifteen pounds pressure and at about 250° F. temperature, enters the space above the slide perforations 112.

At the same time the lower branch of the passage 251 comes in communication with a peripheral channel 254 also formed in the wall 41. This channel is connected to a sterile water supply pipe 255. In this way sterile water is supplied for flushing the perforations of the tube slide f.

As soon as the filling tube d has been emptied of its charge of corn it is ready for cleaning. As the slide unit reaches the position h—h the open end of the tube d and the opening 113 of the tube slide f, which is still aligned therewith, pass over a channel 261 (Fig. 3) which extends between positions h—h and i—i. This channel 261 is formed in the top chamber wall 45 and is connected by a passage 262 to a sterile water supply pipe 263. As soon as the plunger h completes the filling of the can the plunger is immediately raised and as the plunger moves up through the empty filling tube d sterile water coming through the pipe 263, passage 262 and channel 261, flows into the filling tube, this water rising in the tube and following the bottom end of the plunger as it ascends.

At the same time, that is, during the passage of the slide unit between position h—h and i—i which takes about two seconds, sterile water is forced into the middle chamber i against the steam pressure of fifty-two pounds. It will be recalled that this steam pressure is maintained in the chamber throughout all of the preceding period following its first introduction by way of the channel 194.

As illustrated in Fig. 12 a passageway 271 is formed in the spaced wall 67 adjoining the slide unit 23 and the outer end of this passageway opens into the outer end of the pocket 66 which brings it into communication with the middle chamber i. The inner end of the passageway 271 during this movement between positions h—h and i—i comes into communication with a peripheral channel 272 (Fig. 13) which is joined with a water supply pipe 273. As long as the channel 272 is in communication with the inner end of the passageway 271 sterile water under sufficient pressure flows into the middle chamber i and this water covers over the exposed floor of the pocket 66.

When the slide unit passes the position i—i the open bottom of the slide tube, that is the opening 113 in the tube slide f, passes over a channel 275 which connects with a drain pipe 276. It is at this time that the piston ring 175 on the rising plunger h reaches the top of the straight bore of the filling tube. As the plunger h continues to rise communication is made between the middle chamber i and the water filled tube d.

The sterile water which was forced into the filling tube from below and which followed the lower end of the rising plunger together with the sterile water which entered the middle chamber i by way of the passageway 271 now suddenly discharges through the filling tube, through the opening 113 in the tube slide f and out through the channel 275 and pipe 276. This discharge is very rapid since the full fifty-two pounds of steam pressure within the chamber i above the water in the chamber is effective against the draining water. This drainage period continues about three seconds or until position k—k is reached. It is at this later position also that the chamber steam pressure of fifty-two pounds is shut off from the chamber, the slide unit at that time passing beyond the end of the peripheral channel 194.

As the slide unit approaches the position k—k and while the draining period just mentioned is still going on, the tube slide f is moved from its full open position of Fig. 11 into the perforation position where its perforations 112 are brought into alignment with the bottom end of the open filling tube d.

Just after leaving position k—k the slide unit is moved from its inner position to the outer position, the plunger h just prior to such movement having been brought into its fully raised position and held in place by the detent 141 as previously described.

Concentric steam channels 281 (Figs. 2 and 3) are also provided in the stationary frame part in order to further insure against any contamination of the various channels which have already been described as being formed in the upper surface of the horizontal wall 42 and in the upper surface of the cover plate 45 on which move the housing 22 and parts carried thereby. These channels protect against entrance of germs from outside of the structure or from the inside of the moving surface along the central frame wall 41. Channels 281 are relatively deep and extend as continuous concentric rings in the stationary frame parts 42, 45. The outer of these channels is located near the periphery of the composite wall 42, 45 and are therefore outside of the frame channels and passages previously mentioned. The inner channel is inside of such frame channels.

The two channels 281 are joined together at position h—h by a cross groove 282. This cross groove gives added protection for the filling zone. It especially protects the tube slide f as it moves from the can filling zone between g—g and $h$—$h$ to the cleaning zone between $h$—$h$ and $k$—$k$.

Both concentric channels 281 are supplied by high pressure steam preferably between thirty and forty pounds pressure and a corresponding temperature of from 274° F. to 286° F. This is maintained in the channels by means of supply steam channels 283 which are located at different positions in the wall 42 and which join with steam pipes 284.

The rotating wall part 61 where it comes in contact with the channels 281 is cut in its lower surface with corresponding concentric channels 286 (Figs. 2, 7 and 8) these upper channels cooperating at all times with the lower channels and increasing the capacity for steam to further insure against contamination.

Provision is made for draining these channels when desired and for this purpose a drain pipe 287 (Fig. 3) connects with the cross channel 282. This pipe may carry a suitable valve 288. On the opposite side of the machine the two channels 281 may join with a drainage passage 289 connected to a pipe 290 in which a valve 291 is located.

This high pressure steam not only protects the heating tube $d$ from bacterial contamination from the bottom and not only protects the lower tube slide $f$ from bacterial contamination but the steam filled channels also help support the rotating mechanism 22 since the steam pressure is counter to the weight of the moving parts.

It has been suggested in the preceding description that the corn while being subjected to steam while in the hopper $a$ and also while in the filling tube $d$ may be in the presence of a liquid. In some cases it may be desirable to treat the product at such time with a liquid and this can very conveniently be done in the described machine by inserting the required quantity of liquid into the hopper instead of performing the washing operation disclosed in Fig. 9. In such case the liquid enters from the pipe 161 and discharges into the top of the hopper through the perforated spray head 164. The liquid is retained within the hopper by steam which is introduced from the bottom through the perforated web 95. The sterilizing steps in the hopper follow on both product and liquid.

When such treatment of the product is taking place both liquid and product are transferred from the hopper into the filling tube. The sterilizing steps in the tube follow on both product and liquid.

In some cases it will be desirable for the liquid to be filled directly into the can with the product, while in other cases it may be advantageous for the liquid to be drained from the product prior to filling into the can.

In the first instance, that is, where the liquid will be filled into the can with the product, there will not be any drainage of condensate by way of the relief valves 224 and 234. These valves will be closed at such a time and the liquid will therefore be retained with the product as it cools. Where the liquid is to be drained off this draining action will take place along with the drainage of the condensate by way of the relief valves.

It is thought that the invention and many of its attendant advantages will be understood from the foregoing description, and it will be apparent that various changes may be made in the form, construction, and arrangement of parts of the apparatus mentioned herein and in the steps and their order of accomplishment of the process described herein, without departing from the spirit and scope of the invention or sacrificing al of its material advantages, the apparatus an process hereinbefore described being merely preferred embodiment thereof.

I claim:

1. In an apparatus for canning products of the discrete particle type, the combination of a hopper adopted to receive a predetermined charge of product, means for introducing steam into said hopper so that it will circulate among the particles of said product to begin the sterilization of the same, means for transferring the product from said hopper into a filling tube, means for introducing steam into said filling tube to complete the sterilization of said product, means for extracting some of the heat from said sterilized product while in said filling tube, means for filling the sterilized product into cans while in a sealed filling chamber, and means for sealing the filled cans while in said filling chamber.

2. In an apparatus for canning food products of the discrete particle type, the combination of a hopper for holding a charge of the product sufficient to fill a single can, means for forcing live steam into the product to partially sterilize the same, a filling tube for receiving the partially sterilized product from said hopper and for confining the same, means for forcing live steam into the product confined within the tube to complete its sterilization, means for cooling the sterilized product while still confined in said tube while draining liquid from the product, means for forcing the sterilized and cooled product from said tube into a can, and means for sealing the can.

3. In an apparatus for sterilizing food products of the discrete particle type, the combination of a hopper for holding the product to be sterilized, means for circulating live steam in said hopper to partially sterilize the product therein, a filling tube for receiving the partially sterilized product from said hopper, means for circulating live steam through the product within said filling tube to continue its sterilization, means for closing the tube with its partially sterilized product confined therein, and means for introducing live steam at an increased temperature into the confined product within the tube to complete its sterilization.

4. In an apparatus for sterilizing food products of the discrete particle type, comprising in combination a hopper for containing a predetermined quantity of the product, means for subjecting the same while in said hopper to live steam under a given heat and pressure to begin the sterilization of the same, a filling tube, means for transferring the heated product into said tube, means for introducing steam into said tube at higher temperature and at a greater pressure than the steam in said hopper, means for closing said filling tube with its product confined therein, and means for introducing steam at progressively increasing temperatures and pressures in the confined product within said filling tube to complete said sterilization.

5. In an apparatus for canning products of the dicrete particle type, the combination of a supply reservoir for the product, a hopper adapted to receive a predetermined charge of product from said reservoir, means for introducing steam into said hopper to begin sterilization of said product, means for introducing liquid into said hopper, a filling tube adapted to receive the partially sterilized product from said hopper, means for introducing steam into said filling tube to complete the sterilization of said product, means for cooling said product while in said filling tube, means for filling the sterilized and cooled product into a can, and means for sealing the filled can.

6. In an apparatus for sterilizing products of the discrete particle type, the combination of a supply reservoir for holding the product, a filling member for containing the product during a sterilization step, a slide unit for receiving a predetermined quantity of the product from said supply reservoir and for transferring the same to said filling member, said slide unit consisting of a hopper and a plunger, means for placing the hopper of said supply unit under said reservoir to receive its predetermined quantity of product and for moving the hopper into position above said filling member to effect transfer of said product into the filling member, means for partially sterilizing the charge of product while in said hopper, means for completing the sterilization of the product while in said filling member, and means for actuating said plunger to force the sterilized product into a can.

7. In an apparatus for sterilizing products of the discrete particle type, the combination of a supply reservoir for holding the product, a filling member for containing the product during a sterilization step, a slide unit for receiving a predetermined quantity of the product from said supply reservoir and for transferring the same to said filling member, said slide unit consisting of a hopper and a plunger, means for placing the hopper of said supply unit under said reservoir to receive its predetermined quantity of product and for moving the hopper into position above said filling member to effect transfer of said product into the filling member, means for introducing steam in said hopper for partially sterilizing the charge of product while in said hopper, means for introducing steam in said filling member for completing the sterilization of the product while in said filling member, means for cooling the sterilized product while still in said filling member, means for actuating said plunger to force the sterilized and cooled product into a can, and means for sealing the product within the can.

8. In an apparatus for canning products of the discrete particle type, the combination of means for confining a charge of product within a sealed enclosure while circulating steam therein and while subjecting it to an initial sterilization step, devices for transferring the partially sterilized charge of product into a tube member, means for passing steam at a higher temperature into the product while venting the tube member to further advance the sterilization of the product, and means for closing the said tube member and confining the product therein while subjecting it to steam at a still higher temperature to complete the sterilization of the product.

9. In an apparatus for canning products of the discrete particle type, the combination of means for confining a charge of product within an enclosure while circulating steam therein and venting the enclosure and while subjecting it to an initial sterilization step, devices for transferring the partially sterilized charge of product into a tube member, means for passing steam at a higher temperature into the product while venting the tube member to further advance the sterilization of the product, means for closing the said tube member and confining the product therein while subjecting it to steam at still higher and progressively increasing temperatures to complete the sterilization of the product, means for circulating a cooling medium around said tube member to extract some of the heat of and to cool the product, devices for forcing the sterilized and cooled product out of said member and into a can, and means for sealing the product within the can.

10. In an apparatus for canning products of the discrete particle type, the combination of a supply reservoir for the product, a hopper adapted to be brought into alignment with said reservoir to receive a predetermined charge of product, means for moving said hopper out of alignment with said reservoir, means for introducing steam into said hopper so that it will permeate through the particles of said product and partially sterilize the same, means for transferring the product from said hopper into a filling tube, means for introducing steam into said filling tube to complete the sterilization of said product, means for cooling said product while in said filling tube, feeding devices for introducing cans into a sealed filling chamber, means for filling the sterilized and cooled product into said cans while in said chamber, and means for sealing the filled cans in said chamber.

11. In an apparatus for canning products of the discrete particle type, a hopper adapted to receive a charge of product, a perforated sieve plate located beneath said hopper and providing a bottom for the hopper, means for passing steam through said sieve plate so that it circulates through the product within said hopper to begin sterilization, a filling tube adapted to receive the incompletely sterilized product, a perforated tube slide located beneath said tube and providing a bottom for the tube, means for passing steam through said tube slide so that it enters the product contained within said tube and completes sterilization thereof, a filling chamber, means for maintaining said chamber under sterile conditions, a can sterilizer, a valve located in a wall of said filling chamber for transferring empty, sterile cans from said sterilizer and into said chamber, means for removing the sterilized product from said tube and for filling it into a can while within said filling chamber, means for cleaning said hopper after the product has been removed therefrom, means for cleaning said sieve plate after it ceases to function as a bottom for the hopper, means for cleaning said filling tube and said perforated tube slide after the product has been filled into the can and after the tube slide ceases to function as a bottom for said tube, and means for preventing contamination of said filling tube and said tube slide.

12. In an apparatus for canning products of the discrete particle type, the combination of a movable hopper adapted to receive a charge of product, a perforated sieve plate located below said hopper, means for positioning said hopper over said sieve plate so that the latter provides a bottom for the hopper to hold the product therein, means for beginning the sterilization of the product while in the hopper by introducing steam through said sieve plate, a passageway located above said hopper for exhausting the hopper during said initial sterilization step, means to permit said hopper to be emptied by gravity of its product and for moving it away from said sieve plate so that the product may be further treated and completely sterilized, means for actuating said hopper positioning means to return the empty hopper to position over said sieve plate, and means for introducing a cleaning fluid into the top of said hopper to wash it out, the cleaning fluid at such time draining away through said sieve plate.

13. In an apparatus for canning products of the discrete particle type, a filling tube adapted to receive a charge of heated product, a jacket surrounding said tube, a perforated tube slide located beneath said tube and providing a bottom for the tube, means for passing steam through the perforations of said tube slide and through the product for directly supplying sterilizing heat thereto, means for simultaneously passing steam through said tube jacket for indirectly supplying sterilizing heat to the product, a plunger for closing the upper end of said tube, means for simultaneously supplying steam at a higher temperature to the product within said tube and to said tube jacket to complete sterilization of the confined product, means for introducing a cooling fluid into said tube jacket to extract heat from said sterilized product the while draining condensate and other liquid from the product by way of the perforations of said tube slide, means for moving said tube slide to open said tube at the bottom, means for actuating said plunger to discharge the sterilized product from said tube into a can, and means for introducing a cleaning fluid through said tube slide and into said emptied filling tube to clean the same.

14. In an apparatus for canning products of the discrete particle type, the combination of stationary frame, a supply reservoir mounted on said stationary frame, a movable turret adapted to rotate relative to said frame, a plurality of slide units carried on said movable turret, a plurality of filling tubes mounted on and movable with said turret, each of said slide units being adapted to receive a charge of product from the reservoir and to transfer it into a said filling tube, means for introducing steam in said charge of product during its transfer from said reservoir to said filling tube to begin sterilization of the product, means for introducing steam into said filling tube to complete the sterilization of said product, means for cooling the product while within said tube, and means for filling the sterilized and cooled product into a can.

CHARLES O. BALL.